UNITED STATES PATENT OFFICE.

HYLEMAN ALISON WEBSTER, OF COLUMBIA, TENNESSEE.

FERTILIZER AND PROCESS OF MAKING THE SAME.

1,420,596.   Specification of Letters Patent.   Patented June 20, 1922.

No Drawing.   Application filed July 23, 1921. Serial No. 487,104.

*To all whom it may concern:*

Be it known that I, HYLEMAN ALISON WEBSTER, a citizen of the United States, residing at Columbia, in the county of Maury and State of Tennessee, have invented certain new and useful Improvements in Fertilizers and Processes of Making the Same; and I do hereby declare the following to be a full, clear, and exact description of the invention, such as will enable others skilled in the art to which it appertains to make and use the same.

This invention relates to fertilizers and processes of producing the same, and has for its object to provide a new fertilizer which will be more efficient in use, and a process of producing it which will be less costly to carry out, than those which have been heretofore proposed.

With these and other objects in view, the invention consists in the novel steps and combinations of steps constituting the process, and in the novel fertilizer product resulting therefrom, all as will be more fully disclosed below and particularly pointed out in the claims.

In order that the precise nature of the invention may be the more clearly understood, it is said:

Up to the present time, so far as I am aware, the only attempts to utilize farm yard manure, chicken manure, and other similar organic substances in the manufacture of commercial fertilizers, have been based upon the idea of artificially and mechanically drying such nitrogen bearing substances so as to expel a large percentage of the moisture naturally carried thereby, thus producing a material in a condition suitable for mixing with other commercial fertilizer ingredients.

While the employment of these prior methods expels the moisture, eliminates the odors, and destroys the weed seeds and other objectionable matter, yet at the same time, a relatively large percentage of valuable nitrogen, contained in the organic matter as nitrogen or ammonia, is volatilized, driven off and lost, which so increases the cost of these said prior processes as to make them commercially impracticable.

By following the method constituting the present invention, however, the ammonia content of the organic substances is first fixed through chemical reaction, and then the temperature of the mass is raised, by a chemically generated heat, to a point sufficiently high to drive off the moisture, eliminate the odors, and destroy the weed seeds. By following this procedure, there is produced a material of fine mechanical condition, suitable for use as a fertilizer, either alone or in combination, with other well known fertilizing agents, and this new material will contain substantially all of the original nitrogen present in the organic base material.

In carrying out the present process, I first reduce the organic base material to a relatively fine state, as by cutting or shredding, etc., after which I mix therewith an equal quantity of acid phosphate. The free ammonia in the manure immediately combines with the water soluble phosphate in the acid phosphate and probably forms calcium-ammonium phosphate. Whatever may be the reaction which actually takes place, the free ammonia becomes fixed, through a combination with compounds in the acid phosphate, so that it is not lost when the mixture is later heated to dry it.

In this connection, I find it advantageous to employ an acid phosphate which has been newly made, and that the best results are obtained when such phosphate has been taken from the "dens" just before the reaction between the sulphuric acid and the tri-calcium phosphate has been completed. When this is done, there is present some free sulphuric acid, which attacks the nitrogenous compounds in the organic material, oxidizing and converting them into sulphates which are not broken up by the heat subsequently employed in the drying operation. It is not absolutely essential, however, that new acid phosphate be employed, as old well-cured phosphate will give excellent results, and permit of such a small loss of nitrogen that it is almost as good as the new phosphate.

The next step in the process consists in passing the mixture of nitrogenous material and acid phosphate through a suitable mixing machine, while adding thereto a quantity of cotton seed meal, dried blood, fish scrap, tankage, or other suitable nitrogenous material, together with a quantity of finely ground phosphatic limestone, or ordinary limestone carrying carbonate of calcium or carbonate of magnesium. The proportions of these various materials may be, say, one part of cotton seed meal, blood, scrap or other nitrogenous matter, and one part of phosphatic limestone to each 20 parts of the original mixture of organic material and acid phosphate. The entire mass is next placed in a large pile and permitted to remain for from, say, 10 to 30 days, whereupon it will be found suitable for mixing with other well known fertilizer materials, or it may be bagged and sold alone as a complete fertilizer.

Upon the addition of the ground phosphatic limestone, or the calcium carbonate, to the mixture of manure and acid phosphate, the mono-calcium phosphate present in the latter reacts with carbonates of the limestone, with the result that the temperature of the mass is raised, through the chemical heat generated by the reaction, from the prevailing atmospheric temperature of, say, 20°C. to 110°C. or more. This rise in temperature causes a relatively large proportion of the moisture present in the mass to be driven off, as well as effecting the substantially total destruction of the foreign seeds present. Within the first five days, over 50% of the original moisture content of the manure or other organic base material will have been expelled, and the mixture as a whole brought to an extraordinarily fine mechanical condition.

One example of a fertilizer compound made in accordance with the above disclosure might be as follows:

| | |
|---|---:|
| Chicken manure (80% moisture) | 1000 lbs. |
| Acid phosphate (16%) | 1000 lbs. |
| | 2000 lbs. |
| Cotton seed meal | 100 lbs. |
| Phosphatic limestone | 100 lbs. |
| Total | 2200 lbs. |
| Loss in weight account loss of H$_2$O due to chemical heat and reaction | 400 lbs. |
| Net total | 1800 lbs. |

Such a mixture will produce a fertilizer material which will consistently analyze approximately as follows:

| | |
|---|---:|
| Available phosphoric acid | 11.00% |
| Ammonia | 1.75% |
| Potash | .50% |
| | 13.25% |

Under the fertilizer laws in force in many states, a so-called complete fertilizer is required to contain a minimum of 12% available plant food. It will thus be seen that a fertilizer mixture prepared as above disclosed will meet such legal requirements, so that it may be sold alone as a complete fertilizer, there being no necessity for the addition of other materials to make up a deficiency in the available plant food. On the other hand, should a still higher grade of fertilizer containing a still higher percentage of available plant food be desired, the present mixture will be found to constitute an excellent base, to which any suitable amount of phosphoric acid, ammonia, or potash, may be readily added to produce a fertilizer of any desired grade.

It is obvious that those skilled in the art may vary the steps constituting the process, as well as the precise constituents of the product, without departing from the spirit of the invention, and therefore, I do not wish to be limited to the above disclosure except as may be required by the claims.

What I claim is:

1. The process of producing a fertilizer material which consists in providing an organic material containing weed seeds, water and ammonia; adding to said material an agent adapted to fix said ammonia; and adding to the mass an agent adapted to react with said first named agent to produce a chemical heat, whereby said seeds may be destroyed and said water driven off, substantially as described.

2. The process of producing a fertilizer material which consists in providing an organic material containing weed seeds, water and ammonia; adding to said material an agent adapted to fix said ammonia; and adding to the mass additional nitrogenous material and an agent adapted to react with said first named agent to produce a chemical heat, whereby said seeds may be destroyed and said water driven off, substantially as described.

3. The process of producing a fertilizer material which consists in providing an organic material containing water, weed seeds and ammonia; mixing acid phosphate with said material, whereby said ammonia is fixed; and adding to the mass an alkaline earth metal carbonate adapted to react with a portion of said acid phosphate to produce a chemical heat, whereby said seeds may be destroyed and said water driven off, substantially as described.

4. The process of producing a fertilizer material which consists in providing an organic material containing water, weed seeds and ammonia; mixing acid phosphate with said material, whereby said ammonia is fixed; and adding to the mass additional nitrogenous material and an alkali earth metal carbonate adapted to react with a portion of said acid phosphate to produce a chemical heat, whereby said seeds may be destroyed and said water driven off, substantially as described.

5. The process of producing a fertilizer material which consists in providing an organic material containing water and ammonia; adding acid phosphate to said material, whereby said ammonia is fixed; adding an additional nitrogenous material to the mass; and also adding to said mass a phosphatic limestone, adapted to react with acid phosphate to produce a chemical heat, whereby said water may be driven off, substantially as described.

6. The process of producing a fertilizer material which consists in mixing together in substantially equal parts an organic material containing water and ammonia, and an acid phosphate adapted to fix said ammonia; and adding phosphatic limestone to the mixture in substantially the proportions of one part of limestone to 20 parts of the mixture, whereby a chemical heat may be produced and said water driven off, substantially as described.

7. The process of producing a fertilizer material which consists in mixing together in substantially equal parts an organic material containing water and ammonia; and an acid phosphate adapted to fix said ammonia; and adding an additional nitrogenous material and phosphatic limestone to the mixture in substantially the proportions of one part each of said limestone and said nitrogenous material to 20 parts of the mixture, whereby a chemical heat may be produced and said water driven off, substantially as described.

8. The herein described new fertilizer material comprising cotton seed meal and manure in which the ammonia has been fixed, and from which the water has been removed, substantially as described.

9. The herein described new fertilizer material comprising manure, 10 parts; acid phosphate, 10 parts; an additional nitrogenous material, 1 part; and phosphatic limestone, 1 part, substantially as described.

In testimony whereof I affix my signature.

HYLEMAN ALISON WEBSTER.